United States Patent
Kallioinen et al.

(10) Patent No.: US 11,653,662 B2
(45) Date of Patent: May 23, 2023

(54) MILK-BASED FORMULATION

(71) Applicant: VALIO LTD., Helsinki (FI)

(72) Inventors: Harri Kallioinen, Haarajoki (FI); Soile Järviö, Masala (FI)

(73) Assignee: VALIO LTD., Helsinki (FI)

( * ) Notice: Subject to any disclaimer, the term of this patent is extended or adjusted under 35 U.S.C. 154(b) by 551 days.

(21) Appl. No.: 16/774,674

(22) Filed: Jan. 28, 2020

(65) Prior Publication Data

US 2020/0163352 A1 May 28, 2020

Related U.S. Application Data

(62) Division of application No. 14/131,096, filed as application No. PCT/FI2012/050634 on Jun. 19, 2012, now abandoned.

(30) Foreign Application Priority Data

Jul. 6, 2011 (FI) ...................................... 20115726

(51) Int. Cl.
| | |
|---|---|
| A23C 9/16 | (2006.01) |
| A23C 9/142 | (2006.01) |
| A23C 9/15 | (2006.01) |
| A23C 9/146 | (2006.01) |
| A23C 9/12 | (2006.01) |

(52) U.S. Cl.
CPC .............. *A23C 9/16* (2013.01); *A23C 9/1206* (2013.01); *A23C 9/146* (2013.01); *A23C 9/1422* (2013.01); *A23C 9/1427* (2013.01); *A23C 9/15* (2013.01); *A23C 2210/252* (2013.01)

(58) Field of Classification Search
CPC ........ A23C 9/1206; A23C 9/16; A23C 9/1508
See application file for complete search history.

(56) References Cited

U.S. PATENT DOCUMENTS

| | | | |
|---|---|---|---|
| 4,820,348 | A | 4/1989 | Harju |
| 6,827,960 | B2 | 12/2004 | Kopf et al. |
| 6,881,428 | B2 | 4/2005 | Lange |
| 8,445,052 | B2 | 5/2013 | Holst et al. |
| 2004/0040448 | A1 | 3/2004 | Dunker et al. |
| 2005/0181095 | A1 | 8/2005 | Achs |
| 2005/0214409 | A1 | 9/2005 | Tossavainen et al. |
| 2007/0104847 | A1 | 5/2007 | O'Mahony et al. |
| 2007/0166447 | A1 | 7/2007 | Ur-Rehman et al. |
| 2008/0268100 | A1 | 10/2008 | Tervala et al. |
| 2009/0123602 | A1 | 5/2009 | Yan et al. |
| 2010/0055286 | A1 | 3/2010 | Tikanmaki et al. |
| 2010/0215828 | A1 | 8/2010 | Tossavainen et al. |
| 2011/0097442 | A1 | 4/2011 | Harju et al. |

FOREIGN PATENT DOCUMENTS

| | | |
|---|---|---|
| EP | 0 108 838 | 5/1984 |
| EP | 0 203 706 | 12/1986 |
| EP | 0 316 938 | 5/1989 |
| FR | 2 125 137 | 9/1972 |
| JP | 2000-102344 | 4/2000 |
| JP | 2005-525116 | 8/2005 |
| JP | 2005-537011 | 12/2005 |
| WO | WO 96/08155 | 3/1996 |
| WO | WO 03/094623 | 11/2003 |
| WO | WO 2004/019693 | 3/2004 |
| WO | WO 2005/074693 | 8/2005 |
| WO | WO 2009/000972 | 12/2008 |
| WO | WO 2009/043356 | 4/2009 |
| WO | WO 2010/023361 | 3/2010 |
| WO | WO 2010/119439 | 10/2010 |
| WO | WO 2011/051557 | 5/2011 |
| WO | WO 2012/010699 | 1/2012 |

OTHER PUBLICATIONS

USU Extension, "Got Dried Milk?—Delicious ideas to use your food storage and stretch you food dollar", Utah State University Extension, Jul. 2009, p. 1-12. (Year: 2009).*
Jimenez-Flores et al., "Properties of Ultrafiltered Skim Milk Retentate Powders", J. Dairy Sci., vol. 69, No. 2, 1986, p. 329-339. (Year: 1986).*
Patel et al., "Physicochemical and Structural Properties of Ultrafiltered Buffalo Milk and Milk Powder", J. Dairy Sci., 80, (1997), pp. 812-817. (Year: 1997).*
"Milk Carbohydrate (Lactose)," *Milk Facts* 2 pages, http://www.milkfacts.info/Milk%20Composition/Carbohydrate.htm, printed on Mar. 4, 2017.
"Milk Composition Lactose," *Milk Composition & Synthesis Resource Library*, 2 pages, http://ansci.illinois.edu/static/ansc438/Milkcompsynth/milkcomp_lactose.html, printed Mar. 31, 2017.
Burin et al., "Color Formation in Dehydrated Modified Whey Powder Systems As Affected by Compression and $T_g$" *J. Argic. Food Chem.*, vol. 48: 5263-5268 (2000).
Cobos Serraga, "Industrial manufacture of low-lactose dried milk", Anales de la Facultad de Ciencias Quimicas y Farmacologicas, Universidad de Chile, 1979, vol. 29/30, pp. 139-140.
Edelsten et al, "Production of skim milk powder with lactose content reduced by ultrafiltration" Milchwissenschaft, 1983, vol. 38, No. 5, pp. 261-263.
https://en.wikipedia.org/wiki/Maillard_reaction, accessed on Jun. 7, 2019.
Kallioinen et al, "Changes during storage of lactose hydrolysed extended shelflife (ESL) milk" Milchwissenschaft, 2008, vol. 63, No. 4, pp. 381-385.

(Continued)

*Primary Examiner* — Elizabeth Gwartney
(74) *Attorney, Agent, or Firm* — Robert P. Michal, Esq.; Carter, DeLuca & Farrell LLP

(57) ABSTRACT

The invention relates to a milk-based formulation with a reduced carbohydrate content, having a ratio of carbohydrates to protein of at most 1.1, a protein content of at least 5.4% on dry matter basis, and a ratio of ash to protein is substantially similar to that of a milk raw material used as a starting material, and a method for the preparation thereof. The milk-based formulation can be used in the preparation of a recombined milk product with a reduced lactose content, having a full taste of normal milk without any deficiencies in its organoleptic properties.

17 Claims, No Drawings

(56) References Cited

OTHER PUBLICATIONS

Kim et al., "Off-tastes in raw and reconstituted milk," Food and Agriculture Organization of the United Nations, 1983, available at http://www.fao.org/3/X6537E/X6537E00.htm & https://books.google.com/books?isbn=925101258X.

Knipschildt, M.E., et al. "Drying of Milk and Milk Products" in Modem Dairy Technology vol. 1 Advances in Milk Processing, Ed. Robinson, R.K., Springer-Science+Business Media, B.V., 1994, pp. 159-161.

Morgan et al., "Lactose crystallization and early Maillard reaction in skim milk powder and whey protein concentrates" *Lait*, vol. 85: 315-323 (2005).

Smith, "Dried Dairy Ingedients," pp. 1-59(May 15, 2008).

Tossavainen et al, "Effect of lactose hydrolysis on furosine and available lysine in UHT skim milk", Milchwissenschaft, 2008, vol. 63, No. 1, pp. 22-26.

Finnish Search Report in Finnish Serial No. 20115726 dated Mar. 21, 2012.

International Search Report for PCT/FI2011/050634, dated Oct. 23, 2012.

Japanese Office Action in Application No. 2014-517855 dated May 10, 2016 (w/ partial translation).

Notice of Opposition by Arla Foods amba in EP Patent No. 2729012 dated Feb. 21, 2020.

Notice of Opposition by Compagnie Gervais Danone in EP Patent No. 2729012 dated Feb. 20, 2020.

Office Action issued in AR Appln. No. 20120102426 dated Mar. 14, 2019 (w/ translation).

Office Action issued in IN Appln. No. 2398/MUMNP/2013 dated May 27, 2019.

Third Party Observation Against European Patent Application No. EP 12761639.9 submitted on Mar. 31, 2017.

Walstra, P. et al. "Milk Powder" in Dairy Science and Technology, 2nd Edition, CRC Press, 2005, pp. 513-514.

* cited by examiner

MILK-BASED FORMULATION

This application is the divisional of U.S. application Ser. No. 14/131,096 filed Feb. 3, 2014, which is the U.S. national phase of International Application No. PCT/FI2012/050634, filed 19 Jun. 2012, which designated the U.S. and claims priority to Finland Application No. 20115726, filed 6 Jul. 2011, the entire contents of each of which are hereby incorporated by reference.

FIELD OF THE INVENTION

The present invention relates to milk-based formulations. More particularly, the invention relates to milk-based formulations which are suitable for the preparation of recombined milk products with a reduced carbohydrate content.

BACKGROUND OF THE INVENTION

It is well recognized that recombined milk beverages prepared by recombining milk powder and water have several defects compared to normal milk. Deficiencies appear especially in the preparation of recombined milk beverages with reduced lactose contents. The deficiencies are both organoleptical and nutritional in nature. For instance, the recombined milk beverages are susceptible to form precipitates/sediments during heat treatment, and especially during storage of the beverages. The precipitated matter is mainly consisted of milk proteins. It is known that among milk proteins, whey proteins especially are very heat-sensitive. Certain minerals may also have an influence on the precipitation phenomenon of the recombined milk beverages. Currently, the problems associated with the sensitivity of precipitation of the recombined milk products, agglomeration has been avoided by using additives like stabilizers in the products.

Low lactose or lactose-free milk beverages can be prepared from recombined milk beverages by hydrolyzing the lactose thereof. However, the amount of natural lactose content is relatively high, which means that the hydrolysis of lactose produces a great amount of glucose and galactose imparting an uncommon sweet taste to the product.

One important factor causing various problems to the recombined milk products is the Maillard reaction which is a nonenzymatic browning reaction between reducing sugars and free amino groups of milk proteins. The Maillard reaction is a common problem especially in lactose-hydrolyzed milk products. Reducing sugars, glucose and galactose, produced in lactose hydrolysis are more reactive than lactose, thus causing stronger Maillard browning reaction. In hydrolyzed milk, the molar content of these reducing monosaccharides is almost double in comparison with that of regular milk lactose. It is further known that the Maillard reaction becomes even stronger during heat treatment of the lactose-hydrolyzed milk products.

The Maillard browning products cause an undesirable change in the organoleptic properties of the heat-treated milk, such as taste, colour, and structure. In addition, the Maillard reaction has a detrimental effect on the nutritional quality of milk. Bioavailability of lysine which is an important amino acid for the nutritional value is reduced. The Maillard reaction and destruction of lysine continues during the storage at a room temperature after the heat treatment of the milk product.

The Maillard reaction can be monitored by furosine, which presents products formed in the reactions between free amino groups and reducing sugars, and resulting in a loss of their availability.

It is further known that drying of milk to powder changes the quality of milk protein which can be seen in the recombined milk products. The Maillard reaction proceeds also during the production process of milk powders. Proteins also denaturate during drying.

Among many people, there is still much suspicion towards the use of the recombined milk products obviously because of their defective organoleptic properties. Typically, the recombined milk products are not perceived as equating to normal milk.

There is thus a need for new milk products which are suitable for preparing recombined milk products with a reduced carbohydrate content and good nutritional quality, and which reduce or eliminate sediment formation and minimize the taste and texture problems of the recombined milks.

It is very challenging to achieve recombined milk products with reduced carbohydrate contents that are completely flawless in taste and structure, that meet the consumers' expectations on an organoleptically competent milk product, and that are produced economically and simply.

BRIEF DESCRIPTION OF THE INVENTION

It has now been found a milk-based formulation which is suitable for preparing recombined milk products with a reduced carbohydrate content, having a good taste of normal milk, and which avoids the typical problems associated with the similar prior art products. The recombined milk products are completely flawless in their organoleptic properties, especially in taste.

In an aspect, the invention provides a milk-based formulation with a reduced carbohydrate content, having a ratio of carbohydrates to protein of at most 1.1, a protein content of at least 5.4% on dry matter basis, and a ratio of ash to protein is substantially similar to that of a milk raw material used as a starting material.

It was surprisingly found that the defects in organoleptic properties, like precipitation and defects in taste, and nutritional quality of the recombined milk products can be avoided by reducing the lactose content of the milk-based formulation before concentrating it to a form suitable for recombination. As the amount of the products produced in lactose hydrolysis of milk, involving in the Maillard reaction, are reduced, the Maillard reaction is significantly suppressed and the typical problems associated therewith are avoided.

Moreover, the shelf life of the recombined milk products of the inventions, especially at a room temperature, is prolonged.

In another aspect, the invention provides a process for producing a milk-based formulation of the invention, comprising removing carbohydrates from a milk raw material to provide the milk-based formulation with a reduced carbohydrate content.

In a still another aspect, the invention provides a process for producing a milk-based formulation of the invention, comprising
a) separating components of a milk raw material into a protein fraction, carbohydrate fraction and mineral fraction,
b) combining at least a portion of the protein fraction and of the mineral fraction to provide the milk-based formulation.

In a further aspect, the invention provides a use of milk powder having a ratio of carbohydrates to protein of at most 1.1 and a protein content of at least 5.4% on dry matter basis for the preparation of a recombined milk product with a reduced carbohydrate content.

The milk powder of the invention enables to prepare lactose-free milk with good taste without investments in equipment in the plant where the lactose-free milk is prepared. Lactose-free milk can be prepared from the milk powder of the invention and water and/or normal milk. Due to the favourable composition of the milk powder it can be dried to powder with reduced Maillard reactions, Quality of the recombined milk product prepared from the milk powder of the invention is thus improved.

In a still further aspect, the invention provides a process for producing a recombined milk product having a reduced carbohydrate content, comprising recombining milk powder having a ratio of carbohydrates to protein of at most 1.1 and a protein content of at least 5.4% on dry matter basis, and a liquid and optional other ingredients to provide the recombined milk product with a reduced carbohydrate content. The composition of the recombined milk product can be adjusted to correspond to that of normal milk except for lactose by combining the milk powder and liquid without any further additives, like mineral supplement.

The invention provides a process that is simple, economic, industrially applicable on a large scale, and does not cause additional cost.

The invention also provides a process which brings remarkable savings in transportation cost.

The invention further provides a process which allows to control the adverse effects of recombination in an economical, efficient and simple manner.

Taste, colour, and structural defects caused by natural milk enzyme activities and microbe-induced enzyme activities as well as the use of a lactase enzyme and side activities typical of commercial enzyme preparations in the heat-treated recombined milk products are avoided with the process of the invention. With the process of the invention, it is possible to improve the organoleptic properties, especially the stability of the taste properties and structure at room temperature, of the recombined milk products with reduced carbohydrate contents, as a result of which the shelf life of the product can be extended.

DETAILED DESCRIPTION OF THE INVENTION

The term "recombined milk products" is used herein to mean milk products which are prepared by recombining a milk-based formulation with a liquid. Further ingredients, like milk fat (cream, butter) can be incorporated into the recombined milk product in order to obtain a desired fat content of the product. Formulation can also be produced with a desired fat, protein and mineral content.

The term "liquid" is used herein to mean water, a milk raw material, or plant (vegetable) origin material, or a combination of these. Accordingly, the liquid can be, for instance, side streams obtained from manufacturing process of milk products, such as rinsing waters (washing waters) derived from streams obtained from washing/rinsing of processing pipes, containers and vessels in dairy and plant (vegetable) product manufacturing plants. Typically, side streams include UF permeates, NF permeates, RO permeates, RO retentates, diawater, or mixtures thereof. Preferably, the liquid is water, skim milk or RO-retentate.

The term "milk raw material" is used herein to mean milk, whey, and combinations of milk and whey as such obtained from an animal, such as a cow, sheep, goat, camel, mare or any other animal that produces milk suitable for human consumption, or milk that is pre-processed as desired, for example as a concentrate. The milk may be supplemented with ingredients generally used in the preparation of milk products, such as fat, protein or sugar fractions, or the like. The milk may thus be, for instance, full-fat milk, cream, low-fat milk or skim milk, ultrafiltered milk, diafiltered milk, microfiltered milk or milk recombined from milk powder, organic milk or a combination of these. The milk raw material can be, for instance, side streams obtained from manufacturing process of milk products. Preferably, the milk raw material is skim milk.

In an aspect, the invention provides a milk-based formulation with a reduced carbohydrate composition, having a ratio of carbohydrates to protein of at most 1.1, a protein content of at least 5.4% on dry matter basis, and a ratio of ash to protein is substantially similar to that of a milk raw material used as a starting material.

In an embodiment, the formulation has a dry matter content of 8 to 60%.

In an embodiment, the formulation is powder. The dry matter content of powder is typically in the range from 94 to 100%.

An ash to protein ratio of the formulation has a significant effect on the organoleptic properties, especially on taste, of the formulation. In an embodiment of the invention, ash is provided as milk-based minerals in the formulation.

In an embodiment, the ratio of carbohydrates to protein is at most 0.9. In another embodiment, the ratio of carbohydrates to protein is at most 0.4. In still another embodiment, the ratio of carbohydrates to protein is at least 0.02.

In an embodiment, the milk-based formulation comprises 5.4 to 80% protein on dry matter basis.

In an embodiment, a ratio of the monovalent minerals of milk to protein is substantially similar to that of the milk raw material.

In an embodiment, the milk-based formulation is powder.

It is generally known that the protein content of natural milk can vary within quite a wide range, depending on animal species, breed, feeding and season, etc. For example, the protein content of milk obtained from cows can vary between 1.8 to 6.3%.

In an embodiment, the milk-based formulation comprises 5.4 to 65% protein, 4.6 to 41% carbohydrates, and 1.0 to 14% ash on non-fat total solid basis. In another embodiment, the milk-based formulation comprises about 48 to 60% protein, about 24 to 43% carbohydrates, and 10 to 13% ash.

The carbohydrate content of the milk raw material can be reduced by any manner known in the art. Carbohydrates present in natural milk are primarily lactose. Prior to lactose removal, the fat content of the milk raw material may be reduced.

In another aspect, the invention provides a process for preparing a milk-based formulation of the invention, with a reduced carbohydrate content, comprising removing carbohydrates from a milk raw material to provide the milk-based formulation with a reduced carbohydrate content.

In an embodiment, the milk-based formulation is concentrated to powder by an appropriate process, for example by spray drying.

In an embodiment, lactose is removed from the milk raw material by precipitation. The precipitation can be performed in a manner commonly known in the art. Precipitation of lactose allows to efficiently remove lactose from a milk raw material while all the other milk components are substantially retained in a desired manner.

In another embodiment, the lactose removal can be performed by means of enzymatic reactions. Conventional enzymatic processes for splitting lactose, or for conversion of lactose to derivatives, such as lactulose, lactitol, lactobionic acid and their degradation products, are generally known in the field. The process for splitting lactose comprising the step of adding lactase from fungus or yeast to milk in such a manner that lactose is split into monosaccharides, i.e. glucose and galactose, in over 80%. Enzymes typically catalyse several types of reactions, i.e. lactase both hydrolysis and transglucosylation reactions.

In still another embodiment, lactose is removed from the milk raw material by chromatographic separation. The milk raw material is eluated through a column filled with a cation exchange resin. The separation can be carried out so that a significant portion of the proteins and minerals are collected into a single fraction whereas lactose remains in the column.

In still another embodiment, lactose is removed from the milk raw material by means of a membrane filtration technique. Use of membranes with different cut-off values allows to efficiently separate the various milk components, i.e. proteins, carbohydrates and minerals, from each other into different fractions.

If desired, various techniques mentioned above for lactose removal can be combined in an appropriate manner.

Thus, in an aspect, the invention provides a process for preparing a milk-based formulation of the invention, with a reduced carbohydrate content, comprising a) separating components of a milk raw material into a protein action, carbohydrate fraction and mineral fraction, b) combining at least a portion of the protein fraction and of the mineral fraction to provide the milk-based formulation.

In an embodiment, the milk-based formulation prepared above is concentrated to powder.

In dairy industry, ultrafiltration is typically used for separating the proteins and fat from lactose and minerals of milk. Prior to ultrafiltration, the fat content of milk can be standardized for example by separation. The milk proteins, and any fat, remain in the ultrafiltration retentate whereas lactose and minerals pass into a permeate. Ultrafiltration is typically carried out by a concentration factor of 1 to 10.

Lactose and the monovalent minerals, mainly sodium and potassium, present in the ultrafiltration permeate can be separated from each other by nanofiltration. Lactose remains in a nanofiltration retentate, and the monovalent minerals pass into a nanofiltration permeate. The concentration factor of nanofiltration is typically in the range of 1 to 6.

The nanofiltration permeate solution including the monovalent minerals can be concentrated by reverse osmosis to provide a mineral concentrate for use in the milk-based formulation of the invention. Reverse osmosis is generally carried out by a concentration factor of 2 to 20.

In an embodiment, the dry matter content of the milk protein fraction and/or the milk mineral fraction obtained from membrane filtrations can be increased by evaporation, for example to about 17%, and use the evaporated fraction(s) for the preparation of the milk-based formulation.

As stated above, precipitation of lactose from the milk raw material, enzymatic lactose hydrolysis or conversion, and chromatographic lactose separation provide a milk-based formulation where all the other milk components except for lactose are retained in the composition. Membrane filtration technology further provides the possibility to separate lactose and milk minerals, mainly monovalent minerals, from each other and to separately compose an optimized and tailor-made milk-based formulation of the invention from the protein and mineral fractions.

In an embodiment, one or more of the milk component fractions are separately concentrated to powder by an appropriate process and then used for preparing the milk-based formulation of the invention with a desired composition. In another embodiment, the milk-based formulation is first prepared from said fractions in an appropriate manner and then dried to powder.

In a further aspect, the invention provides a use of milk powder having a ratio of carbohydrates to protein of at most 1.1 and a protein content of at least 5.4% on dry matter basis for the preparation of a recombined milk product with a reduced carbohydrate content. In an embodiment, a ratio of ash to protein is substantially similar to that of a milk raw material used as a starting material. In an embodiment, the protein content of the milk powder is at least 37%. In another embodiment, the protein content is at least 45%.

In an embodiment, the recombined milk product is a milk beverage.

In an embodiment, the milk powder is the milk-based formulation of the invention, or prepared by the process of the invention described above.

The amount of the milk powder in the recombined milk product is 0.5 to 15% by weight, preferably 2 to 7% by weight.

In still a further aspect, the invention provides a process for producing a recombined milk product having a reduced carbohydrate content, comprising recombining milk powder having a ratio of carbohydrates to protein of at most 1.1 and a protein content of at least 5.4% on dry matter basis, and a liquid and optional other ingredients to provide the recombined milk product with a reduced carbohydrate content. In an embodiment, the protein content of the milk powder is at least 37%. In another embodiment, the protein content is at least 45%.

The process of the invention may be applied to an industrial large-scale production or to a small-scale production in households.

The lactose content of the recombined milk product is at most 3.1% by weight.

The milk powder can be recombined in a liquid which can be water, a milk raw material, plant (vegetable) origin material, or a mixture thereof. In an embodiment, the recombined milk is prepared so as correspond to composition of normal skim milk except for reduced carbohydrates. In an embodiment of the invention, an ash to protein ratio of the recombined milk product is similar to that of normal skim milk. In an embodiment, ash is provided as milk-based minerals in the recombined milk product. The composition of the recombined milk product can be adjusted to correspond to that of normal skim milk except for reduced carbohydrates by combining the milk powder and liquid without any further additives, like mineral supplement. However, also milk-based minerals can be added to the recombined milk product.

The recombined milk product of the invention can be supplemented with ingredients typically used in milk product. Optional ingredients include edible fat, like milk fat or vegetable fat such as rapeseed oil, fractionated palm oil or coconut oil, vitamins, minerals, fibre, probiotics, flavours.

In an embodiment, the recombined milk product is prepared by recombining powder 1 of the invention with skim milk and water. In another embodiment, the recombined milk product is prepared by recombining 2.4% of powder 1, 54% of skim milk and 43.6% of water.

In an embodiment, the recombined milk product is subjected to a heat treatment. The heat treatment can be performed, for example, at a temperature of 153° C. for 4 seconds.

If desired, any residual lactose present in the recombined milk product is subjected to lactose hydrolysis and/or conversion. The lactose hydrolysis and/or conversion can be performed with commercially available lactase enzymes in a manner known per se. In an embodiment, the lactose content of the recombined milk product is less than 1% by weight, generally designated as a low lactose milk beverage. In another embodiment, the lactose content is less than 0.01% by weight, generally designated as a lactose-free milk beverage.

Lactose hydrolysis can be performed on the recombined milk product which has been heat treated in a manner described above, or on the recombined milk product which is subsequently subjected to the heat treatment. In an embodiment, the lactose hydrolysis is performed after the heat treatment.

The furosine content of the recombined milk beverages prepared according to the invention were measured before and after the heat treatment of the beverages. The furosine content was compared to that of skim milk (beverage 6) and a recombined skim milk prepared by recombining conventional skim milk powder and water (beverage 7), which were used as references. The furosine contents of the beverages prepared from the milk compositions of the invention were lower than that of the reference recombined skim milk both before and after the heat treatment. Specifically, in milk beverages prepared by recombining the milk composition of the invention and water, or a mixture of skim milk and water, the furosine contents were significantly lower than that of the reference recombined skim milk. This indicates that the Maillard reaction is efficiently suppressed even in heat-treated recombined milk beverages. In an embodiment, the furosine content of the recombined milk product of the invention is at most 0.61 mg/g protein prior to heat treatment of the product. In another embodiment, the furosine content of the recombined milk product of the invention is at most 0.92 mg/g protein after heat treatment of the product.

The organoleptic properties of the recombined milk product prepared according to the invention unexpectedly keep at room temperature even during a long storage. The process is easy to perform in production conditions without significant extra costs.

The following examples are presented for further illustration of the invention without limiting the invention thereto.

EXAMPLES

Example 1

Skim milk was ultrafiltered with a GR61PP membrane (Dow, USA) at a temperature of 10° C. and with a concentration factor of 4 to provide an ultrafiltration (UF) permeate and an ultrafiltration (UF) retentate. The UF permeate was further nanofiltered with a Desai DK membrane (Osmonics, USA) at temperatures from 10° C. to 15° C. and with a concentration factor of 4 to provide a nanofiltration (NF) permeate and a nanofiltration (NF) retentate. The NF permeate was concentrated by reverse osmosis (RO) with a Filmtec RO-390-FF membrane (Dow, USA) and with a concentration factor of about 10 to provide an RO permeate and RO retentate.

The RO retentate was evaporated to a dry matter content of 17%.

The compositions of the milk raw material, i.e. skim milk, the UF retentate and permeate, the RO retentate, and the evaporated RO retentate are given in Table 1 below.

TABLE 1

|  | Skim milk | UF ret | UF perm | RO ret | RO ret evapor. |
|---|---|---|---|---|---|
| Protein (%) | 3.4 | 12.2 | 0.2 | — |  |
| Fat (%) | <0.1 | 0.2 | 0.0 |  |  |
| Lactose (%) | 4.6 | 4.9 | 4.5 | 0.2 | 2.0 |
| Ash (%) | 0.8 | 1.6 | 0.5 | 1.7 | 13.8 |
| Dry matter (%) | 9.3 | 19.3 | 5.5 | 2.1 | 17 |
| Na (mg/kg) | 390 | 450 | 370 | 1 700 | 13 500 |
| K (mg/kg) | 1 700 | 1 990 | 1 600 | 6 300 | 50 200 |
| Ca (mg/kg) | 1 200 | 3 700 | 250 | 180 | 1 400 |
| Mg (mg/mg) | 120 | 250 | 70 | 50 | 420 |
| P (mg/kg) | 940 | 2 500 | 340 | 270 | 2 100 |
| Na + K/protein (mg/g protein) |  | 20 |  |  |  |

The evaporated RO retentate (700 kg) and the UF retentate (10 000 kg) were mixed together and evaporated to a dry matter content of 33% to 40%. The resultant mixture was dried to powder (powder 1) with a corresponding heat treatment of the conventional low-heat milk powder.

The UF retentate obtained from ultrafiltration of skim milk was evaporated and dried to powder (powder 2) with a corresponding heat treatment of the conventional low-heat milk powder.

The compositions of powder 1 and powder 2 are given in Table 2 below.

TABLE 2

Compositions of powder 1 and powder 2

|  | Powder 1 | Powder 2 |
|---|---|---|
| Protein (%) | 57.5 | 60.7 |
| Fat (%) | 0.8 | 0.9 |
| Lactose (%) | 23.9 | 24.5 |
| Ash (%) | 12.6 | 7.7 |
| Dry matter (%) | 97 | 96.5 |
| Na (mg/kg) | 6 500 | 2 300 |
| K (mg/kg) | 25 900 | 10 000 |
| Ca (mg/kg) | 18 000 | 18 500 |
| Mg (mg/mg) | 1 300 | 1 200 |
| P (mg/kg) | 12 700 | 12 600 |
| Na + K/protein (mg/g protein) | 56 | 20 |

Example 2

Skim milk was ultrafiltered in a manner described in Example 1 except that the concentration factor was 1.6 to provide an UF retentate.

Cheese whey was nanofiltered with a Desai DK membrane (Osmonics, USA) at a temperature<15° C. and with a concentration factor of 4.5 to provide a nanofiltration (NF) permeate and a nanofiltration (NF) retentate. The NF permeate was concentrated by reverse osmosis (RO) as described in Example 1. The RO retentate obtained was evaporated to a dry matter content of 17.5%.

The compositions of the UF retentate, the cheese whey, the RO retentate, and the evaporated RO retentate are given in Table 3 below.

TABLE 3

|  | UF ret | Cheese whey | RO ret | RO ret evapor. |
|---|---|---|---|---|
| Protein (%) | 5.5 | 0.7 | — | |
| Fat (%) | 0.1 | <0.1 | | |
| Lactose (%) | 4.7 | 4.4 | 0.29 | 3.0 |
| Ash (%) | 1.0 | 0.52 | 1.41 | 14.6 |
| Dry matter (%) | 10.7 | 5.8 | 1.69 | 17.5 |
| Na (mg/kg) | 400 | 370 | 1 400 | 14 100 |
| K (mg/kg) | 1 800 | 1 500 | 5 100 | 52 500 |
| Ca (mg/kg) | 1 700 | 370 | 150 | 1 500 |
| Mg (mg/mg) | 150 | 80 | 45 | 470 |
| P (mg/kg) | 1 300 | 390 | 240 | 2 500 |

The UF retentate of skim milk (10 000 kg) and the evaporated RO retentate of cheese whey (120 kg) were mixed together and evaporated and dried to powder (powder 3) as described in Example 1. The composition of powder 3 is given in Table 4 below.

TABLE 4

|  | Powder 3 |
|---|---|
| Protein (%) | 46.9 |
| Fat (%) | 0.7 |
| Lactose (%) | 40.9 |
| Ash (%) | 10.4 |
| Dry matter (%) | 97 |
| Na (mg/kg) | 5 000 |
| K (mg/kg) | 21 000 |
| Ca (mg/kg) | 15 000 |
| Mg (mg/mg) | 1 300 |
| P (mg/kg) | 11 600 |
| Na + K/protein (mg/g protein) | 55 |

Example 3

Skim milk was evaporated to provide a milk concentrate with a dry matter content of 30%. The milk concentrate was pumped to a chromatography column filled with a cation exchange resin. Skim milk eluated through the cation exchange resin was collected so that a significant portion of milk minerals and proteins were in the same fraction. When the collection of fractions was completed, a significant portion of lactose still remained in the chromatography column. The chromatographic separation was performed at a temperature of about 60° C.

The fraction obtained from the chromatographic separation was dried to powder (powder 4) as described in Example 1.

The composition of the collected fraction from chromatography and powder 4 are given in Table 5 below.

TABLE 5

|  | Chromatographic fraction of skim milk | Powder 4 |
|---|---|---|
| Protein (%) | 5.47 | 64.1 |
| Fat (%) | 0.09 | 0.9 |
| Lactose (%) | 1.4 | 16.3 |
| Ash (%) | 1.2 | 13.5 |
| Dry matter (%) | 8.3 | 96.7 |
| Na (mg/kg) | 1 100 | 12 800 |
| K (mg/kg) | 2 200 | 25 700 |
| Ca (mg/kg) | 1 400 | 18 500 |
| Mg (mg/mg) | 180 | 2 100 |
| P (mg/kg) | 1 400 | 16 000 |
| Na + K/protein (mg/g protein) |  | 60 |

Example 4

Various milk beverages were prepared from the fractions and powders obtained in Examples 1 to 3. The specific recipes are given in Table 7. The numerical values illustrate percentages of each fraction in the recipe.

In addition to said fractions and powders, milk and low-heat milk powder were used in the preparation of the beverages. Their compositions are given in Table 6.

TABLE 6

|  | Skim milk | Low-heat milk powder |
|---|---|---|
| Protein (%) | 3.4 | 36.8 |
| Fat (%) | <0.1 | 0.4 |
| Lactose (%) | 4.6 | 46.1 |
| Ash (%) | 0.8 | 8.2 |
| Dry matter (%) | 9.0 | 96.6 |
| Na (mg/kg) | 390 | 4 200 |
| K (mg/kg) | 1 700 | 17 000 |
| Ca (mg/kg) | 1 200 | 12 000 |
| Mg (mg/kg) | 120 | 1 200 |
| P (mg/kg) | 940 | 9 500 |
| Na + K/protein (mg/g prot) | 61 | 58 |

TABLE 7

|  | Powder 1 | Powder 2 | Powder 3 | Powder 4 | Skim milk | Low heat milk powder | Water | RO ret | UF ret (Example 1) |
|---|---|---|---|---|---|---|---|---|---|
| Beverage 1 | 2.4 | | | | 54.0 | | 43.6 | | |
| Beverage 2 | | 2.4 | | | 54.0 | | 42.7 | 0.9 | |
| Beverage 3 | | | 7.1 | | | | 92.9 | | |
| Beverage 4 | | 2.4 | | | 54.0 | | 43.6 | | |
| Beverage 5 | 2.4 | | | | | 5.4 | 92.2 | | |
| Beverage 6 (reference) | | | | | 100 | | | | |
| Beverage 7 (reference) | | | | | | 9.0 | 91.0 | | |
| Beverage 8 | | | | 2.0 | 60.0 | | 38.0 | | |
| Beverage 9 | | | | | 54.0 | | 33.4 | 0.9 | 11.9 |

The beverages were pasteurized with a direct steam infusion UHT (ultra high temperature) equipment (APV, Denmark) at a temperature of 153° C. for 4 seconds. The beverages were packed aseptically. Prior to packing, 0.03% by weight of lactase (Godo YNL2, Oenon, Japan) was added aseptically to the beverages. The milk beverages were lactose-free after one week storage. The composition of the above nine beverages are given in Table 8.

TABLE 8

|  | Beverage 1 | Beverage 2 | Beverage 3 | Beverage 4 | Beverage 5 | Beverage 6 (reference) | Beverage 7 (reference) | Beverage 8 | Beverage 9 |
|---|---|---|---|---|---|---|---|---|---|
| Protein (%) | 3.3 | 3.3 | 3.3 | 3.3 | 3.4 | 3.4 | 3.3 | 3.3 | 3.3 |
| Fat (%) | <0.1 | <0.1 | <0.1 | <0.1 | <0.1 | <0.1 | <0.1 | <0.1 | <0.1 |
| Lactose (%) | 3.0 | 3.1 | 2.90 | 3.07 | 2.06 | 4.60 | 4.15 | 3.09 | 3.08 |
| Ash (%) | 0.75 | 0.77 | 0.81 | 0.64 | 0.82 | 0.77 | 0.81 | 0.76 | 0.76 |
| Dry matter (%) | 7.23 | 7.37 | 6.96 | 7.21 | 7.62 | 9.00 | 8.77 | 7.36 | 7.31 |
| Na (mg/kg) | 370 | 400 | 370 | 270 | 400 | 390 | 390 | 500 | 400 |
| K (mg/kg) | 1 500 | 1 600 | 1 500 | 1 100 | 1 500 | 1 700 | 1 500 | 1 500 | 1 600 |
| Ca (mg/kg) | 1 100 | 1 100 | 1 100 | 1 100 | 1 100 | 1 200 | 1 100 | 1 100 | 1 100 |
| Mq (mq/ka) | 100 | 100 | 90 | 90 | 100 | 120 | 110 | 110 | 100 |
| P (mq/ka) | 810 | 830 | 820 | 810 | 820 | 940 | 900 | 900 | 820 |
| After heat treatment |  |  |  |  |  |  |  |  |  |
| Furosine (mg/kq) | 18 | 18 | 30 | 19 | 31 | 14 | 42 | 18 | 14 |
| mg/g protein | 0.55 | 0.54 | 0.90 | 0.57 | 0.92 | 0.46 | 1.27 | 0.54 | 0.43 |
| Prior to heat treatment |  |  |  |  |  |  |  |  |  |
| Furosine (mg/kg) | 7 | 8 | 20 | 8 | 21 | 2 | 24 | 6 | 2 |
| mg/g protein | 0.23 | 0.23 | 0.59 | 0.23 | 0.61 | 0.06 | 0.73 | 0.19 | 0.06 |

The beverages having a temperature of about 15° C. were evaluated in their organoleptic properties after about one week after preparation thereof. Results of the evaluation are given in Table 9. The organoleptic properties were compared to normal skim milk (beverage 6) including natural lactose content.

TABLE 9

| Beverage | |
|---|---|
| 1 | Similar to normal milk |
| 2 | Similar to normal milk |
| 3 | Similar to normal milk |
| 4 | Similar to normal milk, slightly watery |
| 5 | Similar to normal milk |
| 6 | Sweet |
| 7 | Sweet |
| 8 | Similar to normal milk |
| 9 | Similar to normal milk |

All the beverages 1 to 9 were prepared so as to have a protein content to a desired level, i.e., about 3.3% (Table 8). Thus, the other results of the beverages are comparable and reliable. It can be seen from the results shown in Table 8 that the furosine content of reference beverage 7 which is a recombined milk beverage produced from skim milk powder alone is significantly higher than that of the other beverages. The lowest furosine level is achieved in beverage 6 which is normal skim milk having a reduced fat content but a natural lactose content, and beverage 9 which is composed from skim milk, water, UF retentate and RO retentate. Surprisingly, only a slight increase in furosine contents of the other beverages compared to beverages 6 and 9 is detected although said other beverages were all prepared from protein-containing powders of milk. Also the furosine contents of beverages 3 and 5 are substantially lower than that of beverage 7 although beverages 3, 5 and 7 are all prepared from water and milk-based powders.

As to the taste of the beverages, the most similar to normal UHT-treated skim milk were beverages 1, 2, 3, 5, 8, and 9. Taste of beverage 4 was similar to that of normal milk except that it was slightly watery. The biggest deviations in taste were found in beverages 6 and 7 which were notably sweet and did not correspond in their properties to normal UHT-treated milk.

Moreover, each beverage 2 to 9 except 5 was further prepared by supplementing them with cream (38%) to provide a fat content of 1.5% to the beverage.

Powder 1 according to Example 1 was prepared from milk by ultrafiltering milk containing fat 3.1% and drying the UF-retentate to powder which was used in similar manner as powder 1 in the preparation of beverages 1 and 5. Beverages 1 and 5 had fat content of 1.5%.

The results obtained for each 1.5% fat containing beverage were similar to those shown in Table 9 except that the watery taste of beverage 4 could be partly masked by fattiness.

Quality of the beverages was controlled organoleptically for 6 months and no significant changes were obtained.

The results show that a lactose-free milk beverage of the invention, prepared from powder 1 produced in Example 1 has a better taste than the recombined milk prepared from normal skim milk powder (beverage 7; reference). Moreover, the furosine content of the beverage of the invention is substantially lower than that of the reference milk. Moreover, surprisingly, the taste and texture remained better in the beverage of the invention than in the normal UHT-treated skim milk.

It will be obvious to a person skilled in the art that, as the technology advances, the inventive concept can be implemented in various ways. The invention and its embodiments are not limited to the examples described above but may vary within the scope of the claims.

The invention claimed is:

1. A process for producing a recombined milk product, comprising
    recombining milk powder having a weight ratio of lactose to protein of at most 1.1, a protein content of at least 45% by weight on dry matter basis, and 10 to 13% ash by weight, with a liquid to provide the recombined milk product having a carbohydrate content from about 4.6 to 41% by weight on non-fat total solid basis.

2. The process of claim 1, wherein the weight ratio of lactose to protein of the milk powder is at most 0.9.

3. The process of claim 1, wherein the weight ratio of lactose to protein of the milk powder is at most 0.4.

4. The process of claim 1, wherein the weight ratio of lactose to protein of the milk powder is in the range from at least 0.02 to at most 1.1.

5. The process of claim 1, wherein the milk powder comprises a milk protein concentrate from ultrafiltration of a milk raw material.

6. The process of claim 1, wherein the milk powder comprises a reverse osmosis concentrate of milk minerals obtained from a nanofiltration permeate derived from nanofiltration of an ultrafiltration permeate of a milk raw material.

7. The process of claim 1, wherein the milk powder comprises a fraction comprising protein and minerals from chromatographic separation of a milk raw material.

8. The process of claim 1, wherein the milk powder comprises 45 to 65% protein by weight and 4.6 to 41% lactose by weight on non-fat total solid basis.

9. The process of claim 1, wherein the milk powder comprises about 48 to 60% protein by weight, and about 24 to 43% lactose by weight.

10. The process of claim 1, wherein the amount of the milk powder in the recombined milk product is 0.5 to 15% by weight.

11. The process of claim 1, wherein the amount of the milk powder in the recombined milk product is 2 to 7% by weight.

12. The process of claim 1, wherein the dry matter content of the milk powder is in the range from 94 to 100% by weight.

13. The process of claim 1, wherein the recombined milk is a beverage.

14. The process of claim 1, wherein the carbohydrate content of the recombined milk product is at most 3.1% by weight.

15. The process of claim 1, wherein the recombined milk product is subjected to a heat treatment.

16. The process of claim 1, wherein any residual lactose of the recombined milk product is hydrolysed.

17. The process of claim 1, wherein the recombined milk product is subjected to a heat treatment, wherein any residual lactose of the recombined milk product is hydrolysed, and wherein any residual lactose of the recombined milk product is hydrolysed after the heat treatment.

\* \* \* \* \*